US011848932B2

(12) United States Patent
Tulshibagwale et al.

(10) Patent No.: US 11,848,932 B2
(45) Date of Patent: *Dec. 19, 2023

(54) SHARED RESOURCE IDENTIFICATION

(71) Applicant: Google LLC, Mountain View, CA (US)

(72) Inventors: Atul Tulshibagwale, Mountain View, CA (US); Sachin Parsewar, Mountain View, CA (US); Kiran Sappa, Mountain View, CA (US); Shipra Banga, Mountain View, CA (US); Amit Singla, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,173

(22) Filed: Jul. 21, 2022

(65) Prior Publication Data

US 2022/0360582 A1 Nov. 10, 2022

Related U.S. Application Data

(63) Continuation of application No. 16/910,344, filed on Jun. 24, 2020, now Pat. No. 11,425,125.

(51) Int. Cl.
*H04L 9/40* (2022.01)
(52) U.S. Cl.
CPC .......... *H04L 63/0884* (2013.01); *H04L 63/10* (2013.01)
(58) Field of Classification Search
CPC .................... H04L 63/0884; H04L 63/10
See application file for complete search history.

(56) References Cited

U.S. PATENT DOCUMENTS

| 9,509,684 | B1 | 11/2016 | Dixson-Boles et al. |
| 10,114,944 | B1 | 10/2018 | Li et al. |
| 2001/0056545 | A1 | 12/2001 | Takechi et al. |
| 2013/0067568 | A1 | 3/2013 | Obasanjo et al. |
| 2013/0273879 | A1 | 10/2013 | Eisen et al. |
| 2014/0082715 | A1 | 3/2014 | Grajek et al. |

(Continued)

FOREIGN PATENT DOCUMENTS

JP 2022578738 6/2023

OTHER PUBLICATIONS

International Search Report, Application No. PCT/US2021/014476, dated Apr. 1, 2021, 13 pages.

(Continued)

*Primary Examiner* — Vance M Little
(74) *Attorney, Agent, or Firm* — Honigman LLP; Brett A. Krueger

(57) ABSTRACT

A method for sharing resource identification includes receiving, at a lookup service, from a first application executing on a particular device associated with a user, a resource identifier (ID) request requesting the lookup service to provide the first application access to a resource ID that identifies the particular device. The method also includes determining, by the lookup service, whether the first application executing on the particular device is authorized to access the resource ID. When the first application is authorized to access the resource ID, the method includes obtaining, by the lookup service, the resource ID and transmitting, by the lookup service, to the first application executing on the particular device, the resource ID.

20 Claims, 6 Drawing Sheets

(56) References Cited

U.S. PATENT DOCUMENTS

| | | | |
|---|---|---|---|
| 2015/0254659 A1* | 9/2015 | Kulkarni | G06Q 20/325 |
| | | | 705/44 |
| 2015/0310194 A1 | 10/2015 | Zhang et al. | |
| 2020/0120104 A1* | 4/2020 | Lu | H04L 63/0884 |
| 2020/0245150 A1 | 7/2020 | Zhao et al. | |

OTHER PUBLICATIONS

Japanese Office Action for the related Application No. 2022-578738, dated Jul. 11, 2023, 2 pages.

\* cited by examiner

SHARED RESOURCE IDENTIFICATION

CROSS REFERENCE TO RELATED APPLICATIONS

This U.S. Patent Application is a continuation of, and claims priority under 35 U.S.C. § 120 from, U.S. patent application Ser. No. 16/910,344, filed on Jun. 24, 2020. The disclosure of this prior art application is considered part of the disclosure of this application and is hereby incorporated by reference in its entirety.

TECHNICAL FIELD

This disclosure relates to sharing resource identification between two or more devices.

BACKGROUND

Representational state transfer (REST) application programming interfaces (APIs) are computing interfaces often used to enable independent systems to communicate about resources of common interest. For example, two independent systems often communicate about a user session or a device being used by a user (e.g., a mobile user device). These resources are typically identified by the API calling the application's presence within that resource. When an API caller wishes to address a shared resource without such a presence, then the API caller must use an alternative means, such as identifying the user account stored at an API sever and associated with the user.

SUMMARY

One aspect of the disclosure provides a method for sharing resource identification. The method includes receiving, at a lookup service executing on data processing hardware, from a first application executing on a particular device associated with a user, a resource identifier (ID) request requesting the lookup service to provide the first application access to a resource ID that identifies the particular device. The method also includes determining, by the lookup service, whether the first application executing on the particular device is authorized to access the resource ID. The method also includes, when the first application is authorized to access the resource ID, obtaining, by the lookup service, the resource ID and transmitting, by the lookup service, to the first application executing on the particular device, the resource ID.

Implementations of the disclosure may include one or more of the following optional features. In some implementations, the resource ID request includes a resource ID scope that includes authentication credentials authenticating the user and a permission granted by the user for the first application to access the resource ID from the lookup service. Determining whether the first application is authorized to the resource ID may include determining that the first application is authorized to access the resource ID based on the authentication credentials authenticating the user and the permission granted by the user for the first application to access the resource ID from the lookup service.

In some implementations, the method includes receiving, at an authentication/authorization service executing on the data processing hardware, from the particular device, a resource ID scope including authentication credentials authenticating the user and a permission granted by the user for the first application to access the resource ID from the lookup service. The method also includes transmitting, by the authentication/authorization service, to the first application executing on the particular device, an access token comprising the resource ID scope. The resource ID request may include the access token.

In some examples, the first application executing on the particular device is configured to invoke an authentication/authorization user interface on the particular device. The authentication/authorization user interface prompts the user to provide the resource ID scope to the authentication/authorization service and authorize the use of the resource ID by the first application. In some examples, the particular device associated with the user includes a physical device. In other examples, the particular device associated with the user includes a virtual device.

The resource ID, in some implementations, is assigned by an entity of the lookup service and shared by one or more computing interfaces of the lookup service to identify the particular device. After the lookup service transmits the resource ID to the first application, the first application is configured to transmit the resource ID to a first remote service associated with the first application and the first remote service is configured to use the resource ID to retrieve information about the particular device from a second remote service. The first remote service may be associated with a different entity than the second remote service. Optionally, the second remote service is associated with a second application executable on the particular device.

Prior to the first remote service retrieving the information about the particular device from the second remote service, the second remote service may receive the resource ID from the second application executable on the particular device. In some implementations, the first application executes in a first execution environment and the second application executes in a second execution environment. The first execution environment is isolated from the second execution environment.

Another aspect of the disclosure provides a system for sharing resource identification. The system includes data processing hardware executing a lookup service and memory hardware in communication with the data processing hardware. The memory hardware stores instructions that when executed on the data processing hardware cause the data processing hardware to perform operations. The operations include receiving from a first application executing on a particular device associated with a user, a resource identifier (ID) request requesting the lookup service to provide the first application access to a resource ID that identifies the particular device. The operations also include determining, by the lookup service, whether the first application executing on the particular device is authorized to access the resource ID. The operations also include, when the first application is authorized to access the resource ID, obtaining, by the lookup service, the resource ID and transmitting, by the lookup service, to the first application executing on the particular device, the resource ID This aspect may include one or more of the following optional features. Implementations of the disclosure may include one or more of the following optional features. In some implementations, the resource ID request includes a resource ID scope that includes authentication credentials authenticating the user and a permission granted by the user for the first application to access the resource ID from the lookup service. In some implementations, the resource ID request includes an access token that is authorized to use a resource ID lookup scope. The access token is based on verifying the user's authentication credentials thereby authenticating the user and a consent by the user for the first application to access the resource ID from the lookup service, i.e. the resource ID lookup scope. Determining whether the first application is authorized to the resource ID may include determining that the first application is authorized to access the resource ID based on the authentication credentials authenticating the user and the permission granted by the user for the first application to access the resource ID from the lookup service.

In some implementations, the data processing hardware further executes an authentication/authorization service. The operations further include, prior to receiving the resource ID request, receiving, from the particular device, a resource ID scope including authentication credentials authenticating the user and a permission granted by the user for the first application to access the resource ID from the lookup service. The operations also include transmitting, by the authentication/authorization service, to the first application executing on the particular device, an access token including the resource ID scope. The resource ID request may include the access token.

In some examples, the first application executing on the particular device is configured to invoke an authentication/authorization user interface on the particular device. The authentication/authorization user interface prompts the user to provide the resource ID scope to the authentication/authorization service and authorize the use of the resource ID by the first application. In some examples, the particular device associated with the user includes a physical device. In other examples, the particular device associated with the user includes a virtual device.

The resource ID, in some implementations, is assigned by an entity of the lookup service and shared by one or more computing interfaces of the lookup service to identify the particular device. After the lookup service transmits the resource ID to the first application, the first application is configured to transmit the resource ID to a first remote service associated with the first application and the first remote service is configured to use the resource ID to retrieve information about the particular device from a second remote service. The first remote service may be associated with a different entity than the second remote service. Optionally, the second remote service is associated with a second application executable on the particular device.

Prior to the first remote service retrieving the information about the particular device from the second remote service, the second remote service may receive the resource ID from the second application executable on the particular device. In some implementations, the first application executes in a first execution environment and the second application executes in a second execution environment. The first execution environment is isolated from the second execution environment.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Representational state transfer (REST) application programming interfaces (APIs) are computing interfaces used to enable independent systems to communicate about resources of common interest. As an example, two independent systems often communicate about a user session or a device being used by a user (e.g., a mobile phone or other user device). These resources are typically identified by the API calling the application's presence within that resource. When an API caller wishes to address a shared resource without such a presence, then the API caller must use an alternative means, such as identifying the user account stored at an API server and associated with the user. However, privacy concerns may prevent the API caller from discovering such information.

In some situations, two applications executing in the same execution environment (e.g., on a user device such as a mobile phone) want to communicate with one another. For example, a first application may want to obtain a security risk posture of the user device from a second application also executing on the user device before performing a service for the user. However, applications present on some user devices are unable to obtain a unique device identifier for the user device because of privacy or security concerns. Thus, it can be difficult for two independent applications to determine that each is executing in the same execution environment (i.e., on the same user device).

Implementations herein are directed toward a system for shared resource identification to allow applications and/or services to obtain an opaque shared resource identifier (ID) to correlate their execution environments. An application executing on a particular device requests, from a lookup service, access to a resource ID. The lookup service determines whether the application is authorized to access the resource ID, and when the application is authorized to access the resource ID, the lookup service obtains the resource ID and transmits the resource ID to the application executing on the particular device. Among other benefits, the system helps alleviate privacy concerns with untrusted applications (i.e., sharing device identification with untrusted devices) as no personal identifiable information needs to be shared and any sharing that does occur is sanctioned by the consent of the user.

Figure 1A:
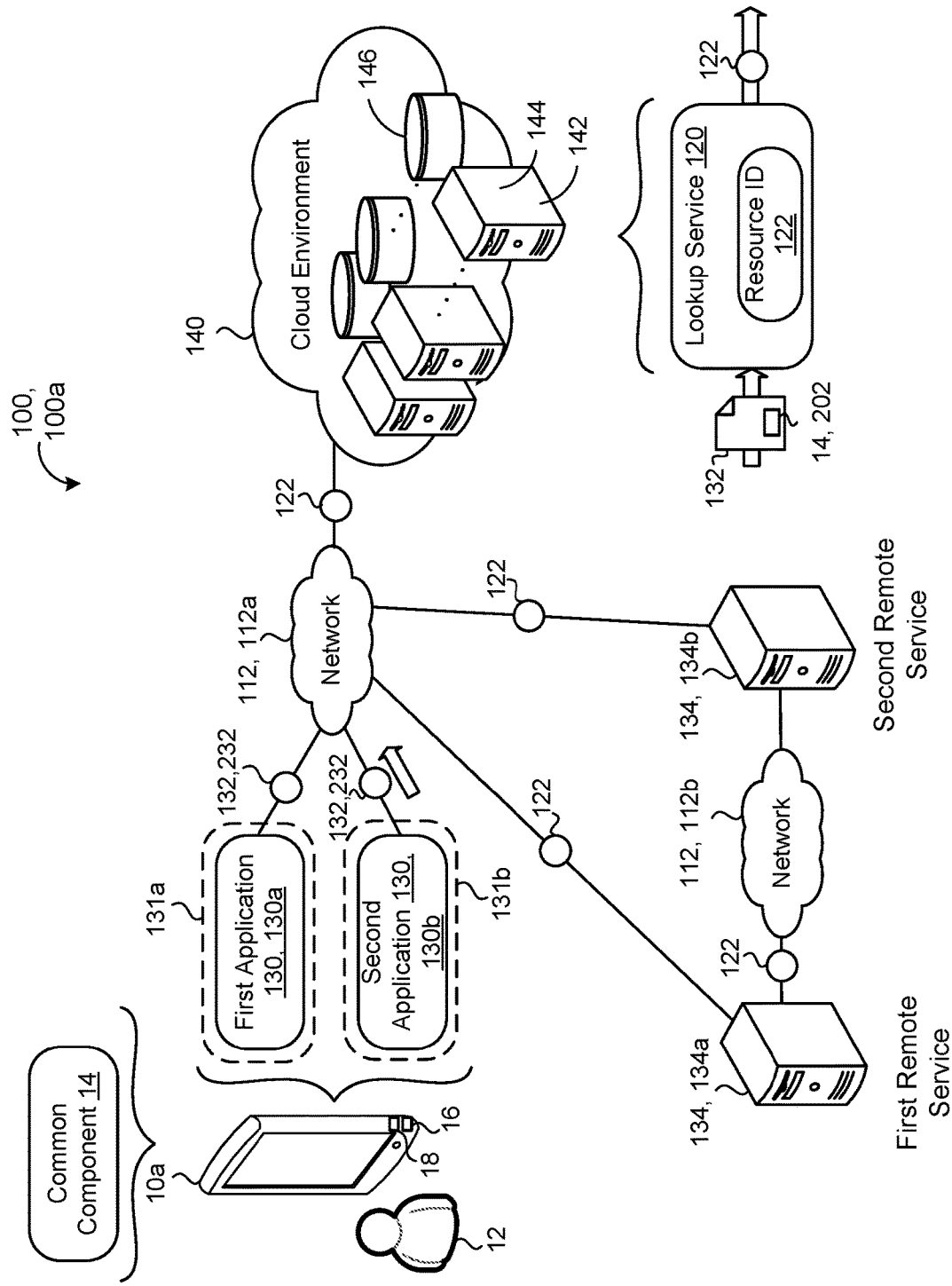
FIGS. 1A and 1B are schematic views of example systems for sharing resource identification.

Referring now to FIG. 1A, in some implementations, an example system 100, 100a includes a user device 10, 10a associated with a respective user 12 in communication with a remote system 140 via a network 112, 112a. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 142 including computing resources 144 (e.g., data processing hardware) and/or storage resources 146 (e.g., memory hardware). The remote system 140 executes a lookup service 120.

The lookup service 120 receives a resource ID request 132 from a first application 130, 130a executing on the user device 10. The first application 130a may be executing within an execution environment 131, 131a independent and/or isolated from any other application also executing on the user device 10. The first application 130a (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The resource ID request 132 requests the lookup service 120 to provide the first application 130a access to a resource ID 122 that identifies the particular device 10. The resource ID 122, in some implementations, is an opaque identifier that provides no information about the user device 10 directly. That is, the resource ID 122 does not include any identifying information regarding the user device 10, but instead, serves as an identifier for an entity of the remote system 140 to identify the particular user device 10. For example, the resource ID 122 may include a random string of numbers and/or letters that computing interfaces, e.g., application programming interfaces (APIs), associated with the entity of the remote system 140 use to identify the particular user device 10.

The lookup service 120 determines whether the first application 130a is authorized to access the resource ID 122. In some implementations, the resource ID request 132 includes a resource ID scope 202 that includes authentication credentials 210 (FIG. 2) authenticating the user 12 and a permission 220 (FIG. 2) granted by the user 12 for the first application 130a to access the resource ID 122 from the lookup service 120. As discussed in more detail below, the lookup service 120 may determine whether the first application 130a is authorized to access the resource ID 122 based on the authentication credentials 210 authenticating the user 12 and the permission 220 granted by the user for the first application 130a to access the resource ID 122 from the lookup service 120.

When the first application is authorized to access the resource ID 122, the lookup service 120 obtains the resource ID 122. In some examples, the resource ID 122 is stored at the lookup service 120. In other examples, the lookup service 120 retrieves the resource ID 122 from another service (e.g., an identification service) executing on the remote system 140 or elsewhere.

In some implementations, the lookup service 120 or another service in communication with the lookup service 120 generates the resource ID 122. The lookup service 120 may generate the resource ID 122 in response to a resource ID request 132 or prior to any resource ID request 132 (e.g., during installation of an application 130 on the user device 10). In other examples, the lookup service 120 or other service associated with a same entity as the lookup service generates the resource ID 122 for the user device 10 the first time the user device 10 accesses a service offered by the entity. To generate the resource ID 122, the lookup service obtains, from the user device 10, one or more common components 14. The common component(s) 14 represent information regarding the user device 10 that is common for each application 130 executing on the user device 10. The common components 14 may include, but are not limited to, information regarding a browser installed on the user device 10 (e.g., version information), a library stored on the user device 10, information regarding another application installed on the user device 10, information regarding an operating system (OS) of the device, etc. The common components 14 may include information that each application, when executing in an isolated execution environment 131, has access to.

A combination of one or more of these common components 14 may be sufficient for the lookup service 120 to distinguish the user device 10 from other user devices 10 that may belong to the same user 12. The lookup service 120 associates these common components 14 received from the user device 10 with a generated resource ID 122. For example, the lookup service stores an association between a randomly generated resource ID 122 and the common components 14. Each resource ID request 132 may include the common components 14 gathered by the respective application 130 and the lookup service 120 determines which resource ID 122, if any, corresponds to the common components of the resource ID request 132.

When the first application 130a is authorized to access the resource ID 122 and after obtaining the resource ID 122, the lookup service 120 transmits the resource ID 122 to the first application 130a executing on the user device 10. Because the resource ID 122 is an opaque identifier (e.g., a random number) of the shared resource (in this example, the user device 10), the resource ID 122 does not reveal any private or identifying information to the first application 130a. Moreover, the resource ID request 132 may include the resource ID scope 202 that provides the authentication credentials 210 authenticating the user 12 and the permission 220 granted by the user for the first application 130a to access the resource ID 122 from the lookup service 120

In some examples, the resource ID 122 is assigned by an entity (not shown) associated with the lookup service and/or remote system 140. The resource ID 122 may be shared by one or more computing interfaces (e.g., application programming interfaces (APIs)) of the entity/remote system 140 to identity the user device 10. The first application 130a may send the resource ID request 132 to the lookup service 120 by performing an "API call" to one of the computing interfaces of the lookup service 120.

In some implementations, a second application 130b is also executing on the user device 10 concurrently with the first application 130a. The second application 130b may execute within a respective isolated execution environment 131b. From within the isolated execution environment 131b, the second application 130b may not communicate with other applications 130 executing on the user device (e.g., the first application 130a). That is, there is no direct means for the first application 130a and the second application 130b to determine that both are executing within the same shared resource (i.e., on the same user device 10).

In some examples, the second application 130b, like the first application 130a, transmits a resource ID request 132 to the lookup service 120 and similarly receives, from the lookup service 120, the resource ID 122 that corresponds to the user device 10. That is, because the second application 130b is executing on the same user device 10 as the first application 130a (and transmits the same common components 14 via the resource ID request 132), the second application 130*b* receives the same resource ID 122 as the first application 130*a*. The user 12 may also grant permission for the second application 130*b* to access the resource ID 122.

After the lookup service 120 transmits the resource ID 122 to the first application 130*a*, in some implementations, the first application 130*a* is configured to transmit the resource ID 122 to a first remote service 134, 134*a* associated with the first application 132*a*. The first remote service 134*a* is configured to use the resource ID 122 to retrieve information about the user device 10 from a second remote service 134*b*. The second remote service 134*b* may be associated with the second application 130*b*. Each remote service 134*a*, 134*b* is associated with an entity (not shown) and the entity associated with the first remote service 134*a* may be different than the entity associated with the second remote service 134*b*.

After both the first application 130*a* and the second application 130*b* receive the resource ID 122 from the lookup service 120, and after each application 130*a*, 130*b* transmits the received resource ID 122 to their respective remote service 134*a*, 134*b*, the remote services 134*a*, 134*b* may communicate via another network 112, 112*b* (which may be the same or different than the network 112*a*) to share information regarding the user device 10. Because both remote services 134*a*, 134*b* received the same resource ID 122, each remote service 134*a*, 134*b* may compare their respective resource IDs 122 and correlate that the first application 130*a* and the second application 130*b* are executing on the same user device 10.

For example, assume that the first application 130*a* allows access to a file storage system stored in the cloud and the second application 130*b* is a security application that determines a security posture of the user device 10. The first application 130*a*, prior to allowing the user 12 to access the file storage system via the user device 10, must receive the security posture of the user device 10 from the second application 130*b*. However, because both of the applications 130*a*, 130*b* are executing in respective isolated execution environments 131*a*, 131*b*, neither application 130*a*, 130*b* may communicate directly with each other. However, both applications 130*a*, 130*b* may communicate with their respective remote services 134*a*, 134*b*. After both the first remote service 134*a* and the second remote service 134*b* receive the resource ID 122, the remote services correlate that both the first application 130*a* and the second application 130*b* are executing on the same user device. Subsequently, the second application 130*b* (i.e., the security posture application in this example) may communicate the security posture of the user device 10 to the second remote service 134*b*, which may in turn communicate the security posture to the first remote service 134*a*. The first remote service 134*a* may then communicate the security posture of the user device 10 to the first application 130*a*. Thus, both applications 130*a*, 130*b*, after receiving consent from the user 12, may communicate about a shared resource using an opaque resource ID 122 that does not allow either application 130*a*, 130*b* any directly identifying information. The first application 130*a* and the first remote service 134*a* may make use of the resource ID 122 from any location (i.e., not just within the context of the user device 10 or other shared resource).

Figure 1B:
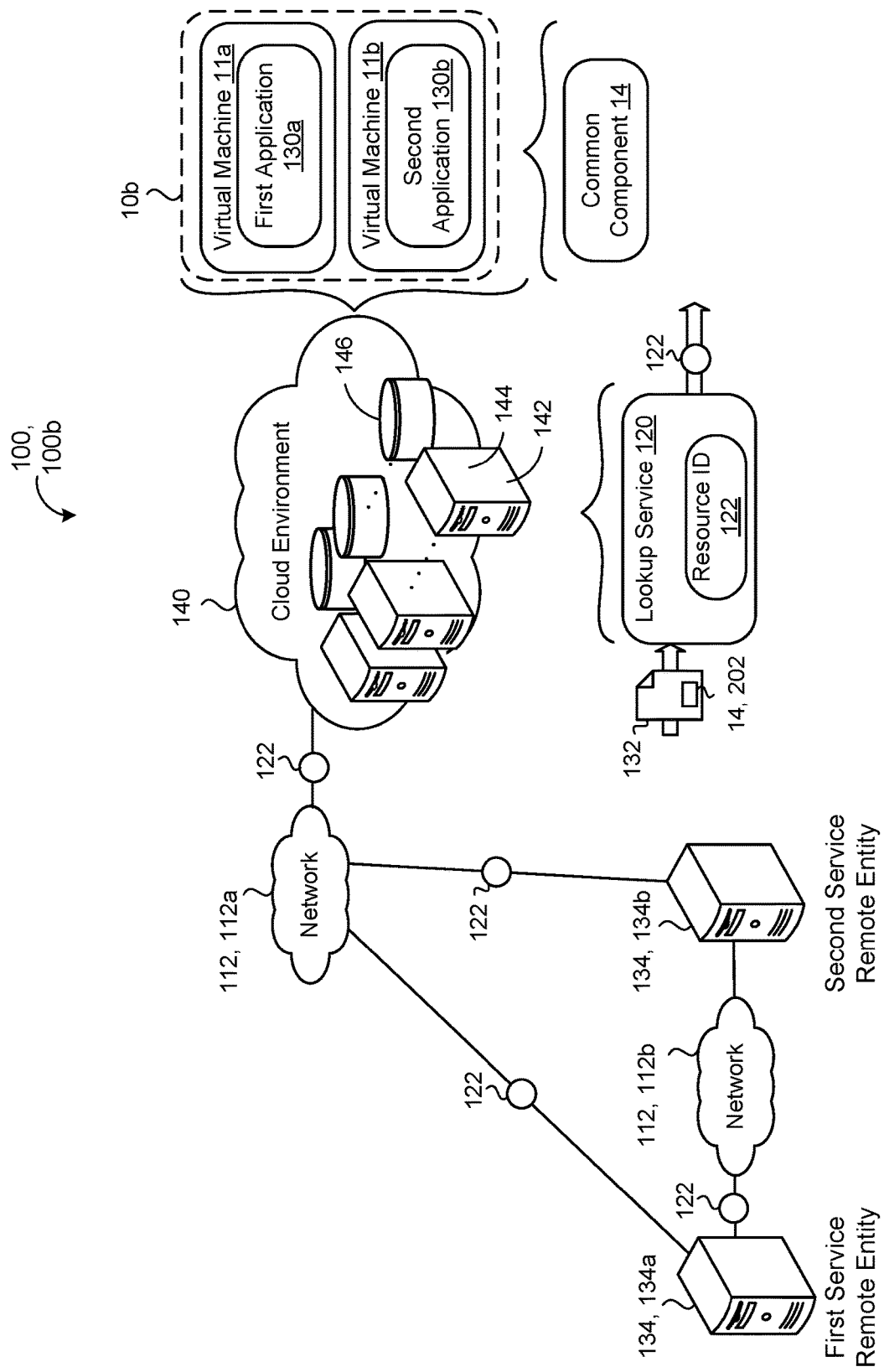

While FIG. 1A illustrates the user device 10 (i.e., the shared resource) as a physical device 10*a*, the user device 10 may correspond to any user device 10 that allows for execution of applications 130 that desire access to the resource ID 122. The user device 10 may include a virtual device 10*b* (e.g., of a containerized system). For example, in FIG. 1B, a system 100, 100*b* includes the user device 10*b* that includes a first virtual machine (VM) 11*a* executing the first application 130*a* and a second VM 11*b* executing the second application 130*b*. Here, because each application 130*a*, 130*b* is executing on separate VMs 11*a*, 11*b*, the applications 130*a*, 130*b* may not readily communicate and thus rely on the resource ID 122 to correlate and share information associated with the user device 10*b*. Here, the user device 10*b* is shown executing on the remote system 140, however the user device 10*b* may also execute in any execution environment independent of the remote system 140 and communicate with the remote system 140 via the network 112*a*.

Figure 2:
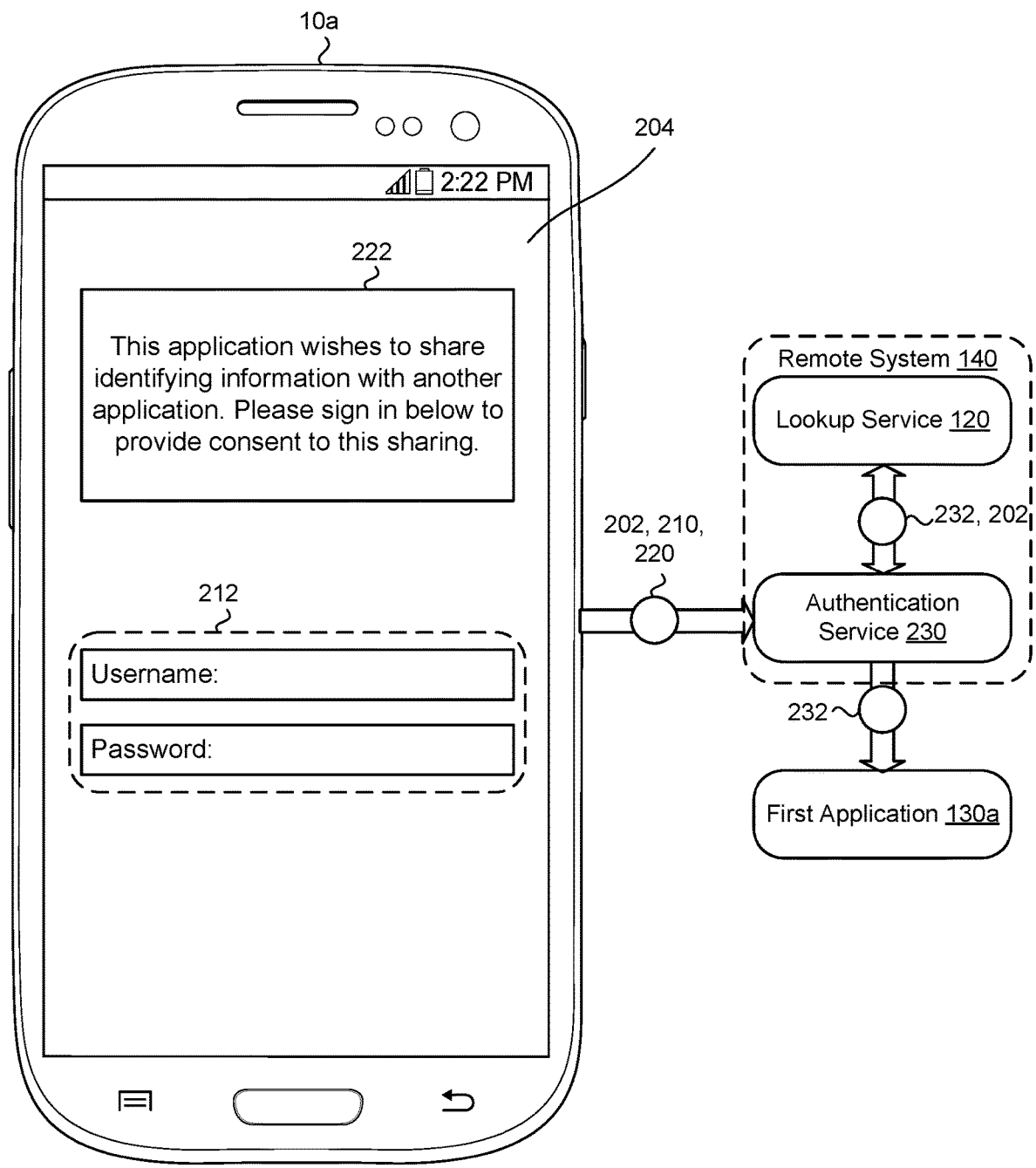
FIG. 2 is a schematic view of an authentication service for obtaining authentication credentials and permission from a user of a user device.

Referring now to FIG. 2, in some implementations, prior to receiving the resource ID request 132, an authentication service 230 (i.e., an authorization/authentication service) executing on the remote system 140 (or, alternatively, on the user device 10) receives the resource ID scope 202 that includes the authentication credentials 210 authenticating the user 12 and the permission 220 granted by the user 12 for the first application to access the resource ID 122 from the lookup service 120. The authentication service may include a library, API, a browser, etc. Optionally, the authentication service 230 transmits an access token 232 (e.g., a sign-on cookie) to the first application 130*a* executing on the user device 10. The access token 232 may include the resource ID scope 202 and the resource ID request 132 may include the access token 232.

As shown in FIG. 2, in some examples, the first application 130*a* executing on the user device 10 is configured to invoke an authentication/authorization user interface 204 on the user device 10 that prompts the user 12 to provide the resource ID scope 202 to the authentication service 230. Here, the authentication user interface 204 includes a message 222 that that indicates to the user 12 that "This application wishes to share identifying information with another application. Please sign in below to provide consent to this sharing." This message 222 ensures that the user 12 is consenting to share the resource ID 122 with the application, and thus, serves as the permission granted by the user 12 for the application to access the resource ID 122. Here, the authentication user interface 204 also includes authentication credential entry area 212 that provides the user 12 an interface for verifying their identity. For example, the authentication credential entry area 212 includes input text boxes for a user name and password, a biometric input (e.g., a fingerprint sensor), a two-factor authentication code entry box, or any other techniques for obtaining authentication and/or authentication credentials 210 and permission 220 from the user 12.

In the example shown, when the user 12 enters their username and password, the user 12 is also consenting to sharing the resource ID 122 with other applications 130 and associated remote services 134, so entry of the username and password includes both the authentication credentials 210 and the permission 220. However, the authentication user interface 204 may prompt for the permission 220 separately (e.g., via prompting the user 12 to mark a checkbox). Thus, the permission 220 indicates to the authentication service that the user 12 consents to sharing the resource ID 122 while the authentication credentials 210 indicate to the authentication service 230 that the consenting user 12 is authorized to consent. In some implementations, an administrator of the user device 10 and/or the system 100 provides consent on behalf of the user 12. That is, in some systems 100, a policy established by the administrator of the system 100 regarding the lookup service 120 and the user device 10 provides consent automatically for the user 12.

The authentication service 230 conveys the resource ID scope 202 (including the authentication credentials 210 and permission 220) to the lookup service 120 executing on the remote system 140. The lookup service 120 (or another service executing on the remote system 140, such as an identification service) authorizes and/or authenticates the user 12 based on the resource ID scope 202 and generates a corresponding access token 232. The lookup service 120 sends the access token 232 to the authentication service 230, which in turn passes the access token 232 to the first application 130a. When the first application 130a issues (e.g., via an API call) a subsequent resource ID request 132 requesting access to the resource ID 122 from the lookup service 120, the first application 130a may provide the access token 232 to the lookup service 120 as proof the first application 130a is authorized to access the resource ID 122, i.e., the authenticated/authorized user 12 consents to sharing the resource ID 122. In some examples, the access token 232 includes a sign-on cookie.

In some implementations, the authentication service 230 provides the first application 130a a previously obtained access token 232. For example, when the user 12 has provided authentication credentials 210 and/or permission 220 within a threshold time period of the current time, the authentication service 230 uses the access token 232 generated previously by the lookup service 120 without prompting the user 12 for additional permission 220 and/or authentication credentials 210 and obtaining a second access token 232. In some examples, the authentication service 230 only prompts the user for permission 220 (without requesting authentication credentials 210) while in other examples, the authentication service 230 only prompts the user for authentication credentials 210 (without requests permission 220).

Figure 3:
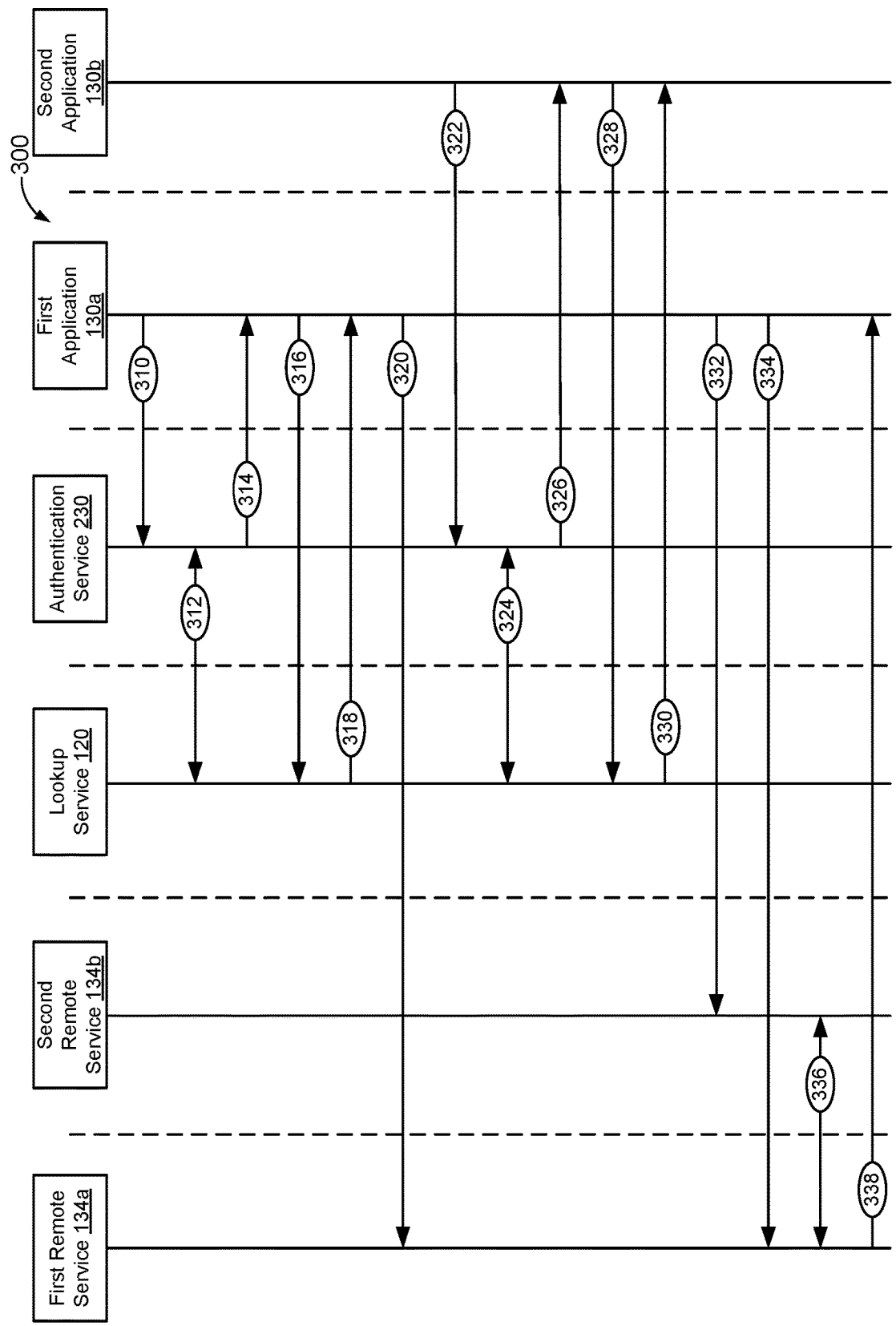
FIG. 3 is a schematic view of a sequence diagram of operations for sharing resource identification.

Referring now to FIG. 3, an exemplary sequence diagram 300 arranges operations by the system 100 in time sequence. At operation 310, the first application 130a requests authentication (e.g., via the user login of FIG. 2) from the authentication service 230. The authentication service 230, at operation 312, communicates with the lookup service 120 (and/or the identity service 124) to authorize and/or authenticate the user 12 via the authentication credentials 210 and permission 220 obtained from the user 12 via the authentication user interface 204. For example, the authentication service 230 obtains the access token 232 from the lookup service 120. At operation 314, the authentication service 230 transmits the access token 232 to the first application 130a. At operation 316, the first application 130a requests access to the resource ID 122 (e.g., via the resource ID request 132). The first application 130a may include the access token 232 with the resource ID request 132.

At operation 318, based on the access token 232, the lookup service 120 provides the resource ID 122 to the first application 130a. In this example, the lookup service 120 previously generated the resource ID 122 based on common components 14. At operation 320, the first application 130a transmits the resource ID 122 to the first remote service 134a associated with the first application 130a.

Operations 322-332 are duplicates of operations 310-320 for the second application 130b instead of the first application 130a. That is, at operation 322, the second application 130b requests authentication from the authentication service 230. The authentication service 230, at operation 324, obtains the access token 232 from the lookup service 120. At operation 326, the authentication service 230 transmits the access token 232 to the second application 130b. At operation 328, the second application 130b requests access to the resource ID 122 (e.g., via the resource ID request 132) using the access token 232. At operation 330, based on the access token 232, the lookup service 120 provides the resource ID 122 to the second application 130b and, at operation 332, the second application 130b transmits the resource ID 122 to the second remote service 134b associated with the second application 130b.

At this point, both the first remote service 134a and the second remote service 134b each have access to the resource ID 122 associated with the user device 10. At operation 336, the first remote service 134a uses the shared resource ID 122 to obtain information about a shared resource associated with the user device 10 from the second remote service 134b (e.g., the security posture of the user device 10). At operation 338, the first remote service 134a transmits the information obtained from the second remote service 134b to the first application 130a. The order of these operations 310-338 are exemplary and may occur in any order. For example, the remote services 134a, 134b shares information (at operation 336) prior to receiving the request for information from the first application 130a (at operation 334).

In some examples, when the first remote service 134a and the second remote service 134b compare resource IDs 122, the remote services 134a, 134b determine that the applications 130a, 130b are not executing on the same user device 10. In this scenario, the first remote service 134a may communicate an error message to the first application 130a. The first application 130a, in response to the error message from the first remote service 134a, display the error message (e.g., via a graphical user interface of the user device 10) to the user 12. In some implementations, the error message provides the user 12 the means to install the second application 134b (e.g., by providing a link or by redirecting the user 12 to an application installation site).

Figure 4:
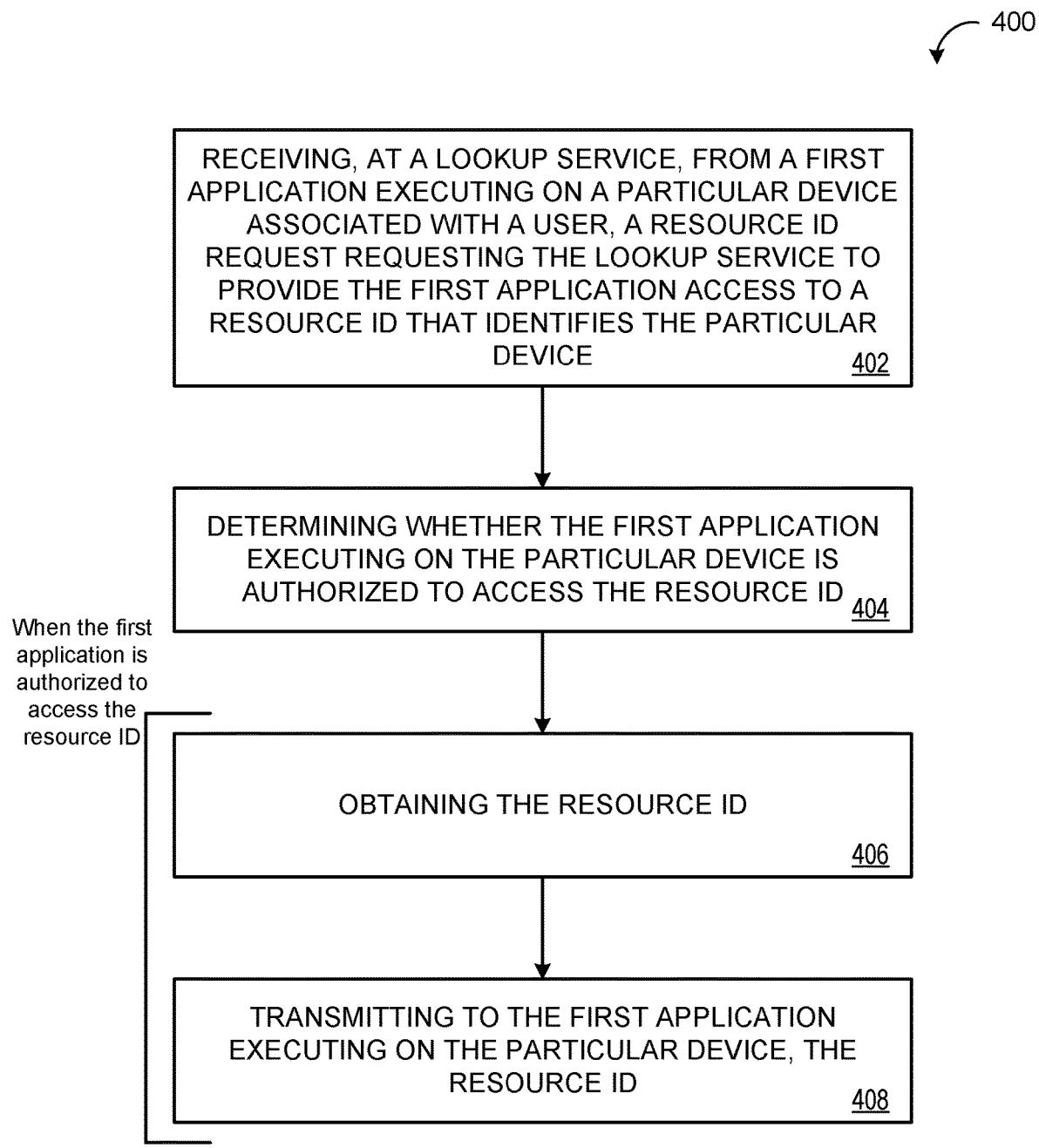
FIG. 4 is a flowchart of an example arrangement of operations for a method of sharing resource identification.

FIG. 4 is a flowchart of an exemplary arrangement of operations for a method 400 for sharing resource identification. The method 400, at operation 402, includes receiving, at a lookup service 120 executing on data processing hardware 144, from a first application 130a executing on a particular device 10 associated with a user 12, a resource identifier (ID) request 132 requesting the lookup service 120 to provide the first application 130a access to a resource ID 122 that identifies the particular device 10. At operations 404, the method 400 includes determining, by the lookup service 120, whether the first application 130a executing on the particular device 10 is authorized to access the resource ID 122. When the first application 130a is authorized to access the resource ID 122, the method 400, at operation 404 includes obtaining, by the lookup service 120, the resource ID 122 and, at operation 406, transmitting, by the lookup service 120, to the first application 130a executing on the particular device 10, the resource ID 122.

Figure 5:
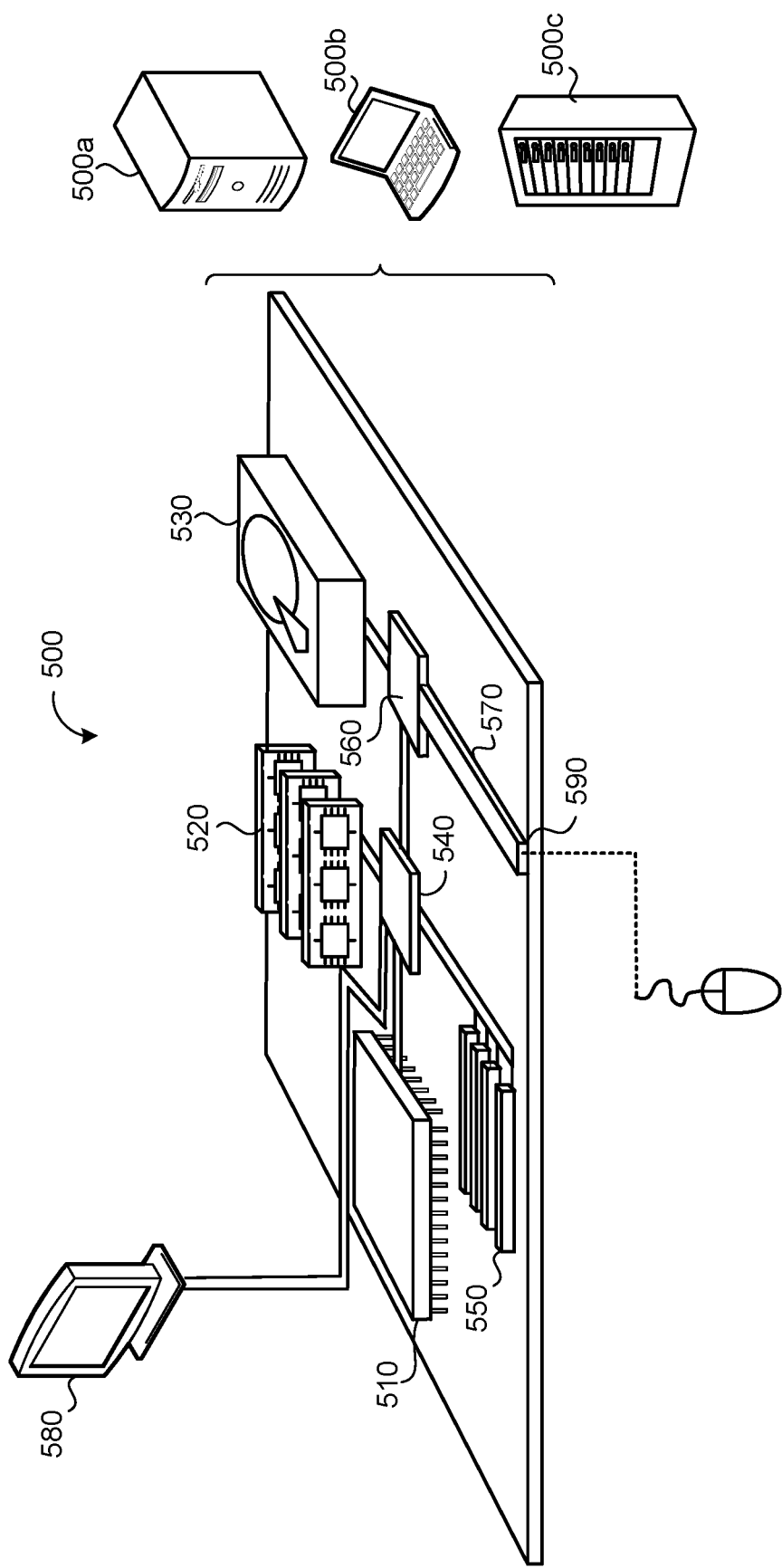
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosures described and/or claimed in this document.

The computing device 500 includes a processor 510, memory 520, a storage device 530, a high-speed interface/ controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    receiving, from an application executing on a particular device associated with a user, authentication credentials authenticating the user;
    transmitting, to the application executing on the particular device, an access token corresponding to the authentication credentials;
    after transmitting the access token, receiving, from the application executing on the particular device, a resource identifier (ID) request requesting access to a resource ID that identifies the particular device, the resource ID request comprising the access token;
    determining that the application executing on the particular device is authorized to access the resource ID based on the access token; and
    based on determining that the application executing on the particular device is authorized to access the resource ID based on the access token, transmitting, to the application executing on the particular device, the resource ID.

2. The computer-implemented method of claim 1, wherein:
    the particular device comprises a virtual device executing a plurality of virtual machines; and
    the resource ID identifies the user.

3. The computer-implemented method of claim 2, wherein the application executes on a first virtual machine of the plurality of virtual machines.

4. The computer-implemented method of claim 1, wherein the particular device comprises a user device.

5. The computer-implemented method of claim 1, wherein the resource ID comprises an opaque identifier that does not provide any information about the particular device.

6. The computer-implemented method of claim 1, wherein the resource ID comprises a random string of numbers and letters.

7. The computer-implemented method of claim 1, wherein receiving the authentication credentials authenticating the user comprises receiving a permission granted by the user for the application executing on the particular device to access the resource ID.

8. The computer-implemented method of claim 7, wherein determining that the application executing on the particular device is authorized to access the resource ID is further based on the permission granted by the user for the application executing on the particular device to access the resource ID.

9. The computer-implemented method of claim 1, wherein the authentication credentials comprise a username and password associated with the user.

10. The computer-implemented method of claim 1, wherein the application executes within an execution environment isolated from any other application executing on the particular device.

11. A system comprising:
    data processing hardware; and
    memory hardware in communication with the data processing hardware, the memory hardware storing instructions that when executed on the data processing hardware cause the data processing hardware to perform operations comprising:
        receiving, from an application executing on a particular device associated with a user, authentication credentials authenticating the user;
        transmitting, to the application executing on the particular device, an access token corresponding to the authentication credentials;
        after transmitting the access token, receiving, from the application executing on the particular device, a resource identifier (ID) request requesting access to a resource ID that identifies the particular device, the resource ID request comprising the access token;
        determining that the application executing on the particular device is authorized to access the resource ID based on the access token; and
        based on determining that the application executing on the particular device is authorized to access the resource ID based on the access token, transmitting, to the application executing on the particular device, the resource ID.

12. The system of claim 11, wherein:
    the particular device comprises a virtual device executing a plurality of virtual machines; and
    the resource ID identifies the user.

13. The system of claim 12, wherein the application executes on a first virtual machine of the plurality of virtual machines.

14. The system of claim 11, wherein the particular device comprises a user device.

15. The system of claim 11, wherein the resource ID comprises an opaque identifier that does not provide any information about the particular device.

16. The system of claim 11, wherein the resource ID comprises a random string of numbers and letters.

17. The system of claim 11, wherein receiving the authentication credentials authenticating the user comprises receiving a permission granted by the user for the application executing on the particular device to access the resource ID.

18. The system of claim 17, wherein determining that the application executing on the particular device is authorized to access the resource ID is further based on the permission granted by the user for the application executing on the particular device to access the resource ID.

19. The system of claim 11, wherein the authentication credentials comprise a username and password associated with the user.

20. The system of claim 11, wherein the application executes within an execution environment isolated from any other application executing on the particular device.

\* \* \* \* \*